Aug. 21, 1928.
J. J. MILLER
1,681,493
PROCESS OF MAKING BUILDING MATERIAL
Filed Feb. 16, 1925
Fig. 1.
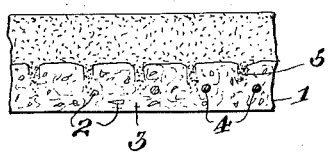
Fig. 2.
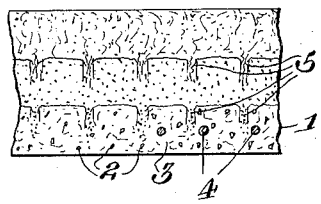
Fig. 4.
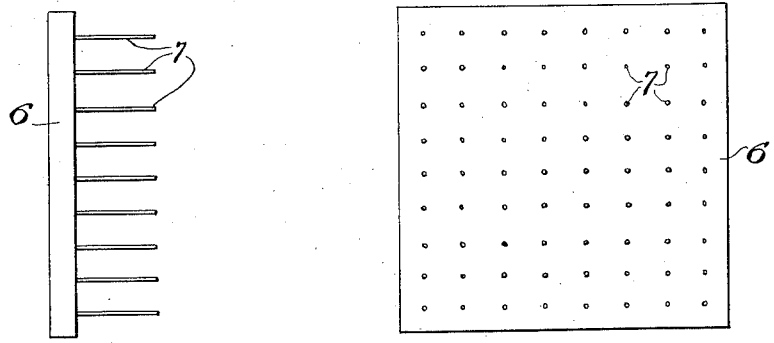
Fig. 3.
Inventor
John J. Miller.
By Mason Fenwick & Lawrence
Attorneys Patented Aug. 21, 1928.

1,681,493

UNITED STATES PATENT OFFICE.

JOHN J. MILLER, OF CHICAGO, ILLINOIS, ASSIGNOR OF ONE-THIRD TO JAY D. MILLER, OF CHICAGO, ILLINOIS.

PROCESS OF MAKING BUILDING MATERIAL.

Application filed February 16, 1925. Serial No. 9,695.

This invention relates to an improvement in building materials and in the process of making the same, and is directed more particularly to an improved composition substitute for wood, stone, brick, tile, metal, glass, cement, stucco, concrete, slate, asbestos and other building materials now and heretofore in common use, for such purposes as shingles, clapboards, slabs and the like.

Such substitute building material has commonly been made with various compositions of slate, wood, stone, metal, asbestos, cement, glass, tile, etc., but such compositions have been objectionable, either by reason of excessive weight, brittleness, their non-fireproof character, excessive expense or a liability to deterioration.

An object of the present invention is to provide a composition substitute for wood and the other materials above mentioned, for the purposes indicated, of an improved character and structure by reason of which it is light, fireproof, strong and very durable.

The invention consists in the improved process and product as hereinafter more particularly described and claimed.

One sheet of drawings accompanies this specification as part thereof in which like reference characters indicate like parts throughout.

Fig. 1 is a cross sectional diagrammatic view through one form of my improved material.

Fig. 2 is a transverse section through a modified form of my improved material.

Fig. 3 is a side elevation of a tool utilized in the process.

Fig. 4 is a plan view of the tool shown in Fig. 3.

In accordance with my invention a plastic mixture is made embodying from 2 to 30 parts by weight of any desired fibrous material, such for instance as ground or shredded paper, straw, weeds, corn stalks, bagasse, flax, hemp, cotton waste, sunflower stalks, metal-wool or shredded metal; with 98 to 70 parts by weight of calcined gypsum, and sufficient water to produce a spreading consistency. This mixture is spread quickly and uniformly in the pan or mold of proper shape, and when increased strength is required, shredded metal, metal screen, metal rods, or any of them, should be embedded in proper position in the wet mixture to reinforce the finished product.

Referring to drawings the layer just described is indicated by the numeral 1, in which the fibrous material is indicated by the numeral 2, and the calcined gypsum contained is indicated by the numeral 3, while the metal reinforcement rods, netting, screen or fiber are indicated by the numeral 4.

While the mixture previously described is still wet, a second layer is spread over it comprising 10 to 50 parts by weight of calcined gypsum, and 90 to 50 parts by weight of Portland cement, previously mixed with sufficient water to secure proper plasticity. As soon as this mixture is slightly set, but still soft, the two layers are interlocked or connected to form a binder between the two, preferably by forcing portions of the upper layer into the lower layer or cavities formed therein as indicated in the drawings by numeral 5.

This interlocking of the layers may conveniently be secured by tools such as are illustrated in Figures 3 and 4, consisting generally of a plate or base 6 secured upon which are a plurality of spaced projections, nails or prongs 7. By forcing these prongs into the two layers while in a plastic condition, portions of the upper layer will be forced downwardly through the upper layer and into the lower layer as indicated in the drawing, thus effectively interlocking the two layers, so as to secure sufficient intermixture of the two layers of materials to effect, when set, the thorough binding of the two layers, then smooth over the surface while moist or wet, thus further binding the layers. If this layer is to be the top or outer part of a finished product, it may be dyed to produce any desired color before allowing to dry and harden. Additional water-proofing substances may also be added if desired.

Where as thicker or more durable product is desired a third layer may be added as is illustrated in Fig. 2, the outer or uppermost layer comprising a suitable mixture of Portland cement, clean silicious material, such as sand, and water mixed into proper spreading plasticity. In this case as before, the three layers are interlocked by using a similar tool as indicated to stamp some of the top layer into one or more of the lower layers, then smooth over the surface while it is still soft and let the product harden after coloring matter, if desired, has been added. The product may be further water-proofed in any suitable manner.

The essence of the invention consists in the use of layers which produces a composition which is lighter for the body, first layer, and gives added strength and hardness, without brittleness, is fireproof, waterproof and weather proof. Neither layer will, by itself, produce these results nor will a homogeneous mixture of the two do so.

The same character of improvement is obtained by use of three layers. If the first layer or body is used without the second layer, or if the two layers were mixed homogeneously, the product would be less plastic, less fireproof, weatherproof and waterproof, the latter because the fiber would be on the surface and would not be weatherproof or fireproof. Moreover the gypsum so exposed would not be waterproof or weatherproof. Each layer is a homogeneous mass, but the product is non-homogeneous, and if a single homogeneous mass is employed, a heavier composition would be required in order to produce a product having the advantages stated, since the fiber could not be used and the body would contain cement or the like to make it waterproof, fireproof and weatherproof, which would necessarily make it heavier. The three layer product, described above, is extremely hard and durable and sufficiently waterproof for practical purposes. It is permanent, inexpensive, fireproof, light in weight, not brittle, and proof against most severe shocks. I am also enabled to use more fiber and obtain a lighter, tougher and more flexible product to withstand rough usage, expansion and stresses.

Having thus described my invention I claim:—

1. The process of making a composition building material which consists in forming a layer of plastic material in a suitable mold, superposing upon said layer a second layer of cementitious material, and then forcing a plurality of spaced prongs through said superposed layers, whereby portions of the upper layer are forced into the lower layer to mechanically interlock the layers.

2. The process of making a building material which consists in forming a layer of plastic material, superposing a second layer of plastic material on the first, and then before either of said layers have set, forcing a portion of the bottom of the superposed material into the top of the lower layer of material.

In testimony whereof I affix my signature.

JOHN J. MILLER.